H. A. WHEELING.
SPRING WHEEL.
APPLICATION FILED JUNE 14, 1912.
1,110,849.
Patented Sept. 15, 1914.
2 SHEETS—SHEET 1.
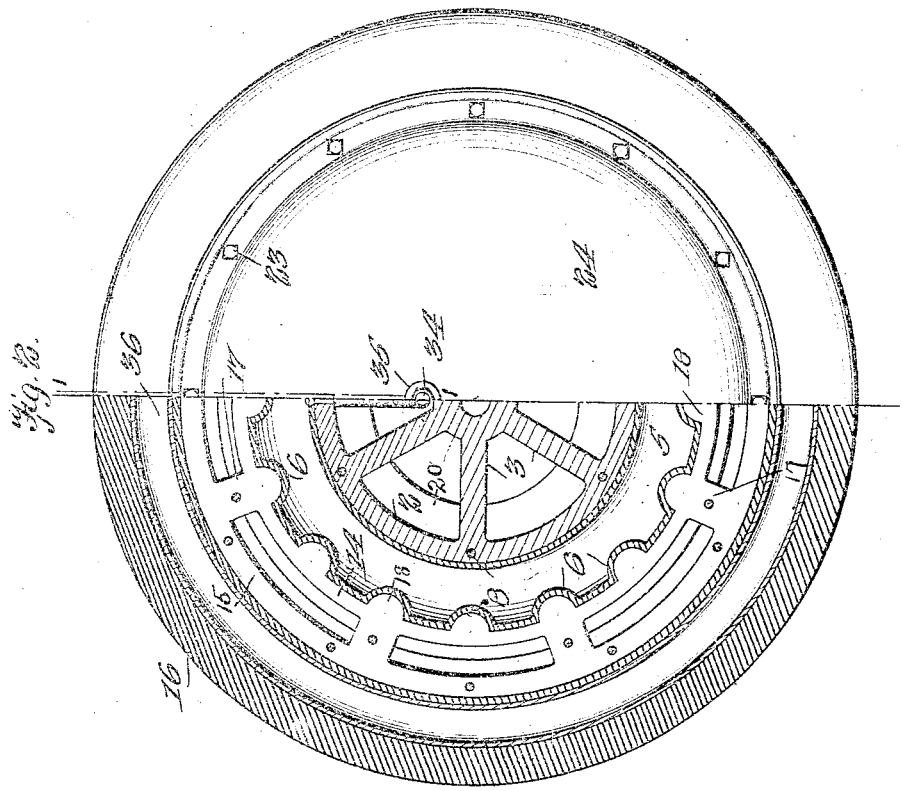
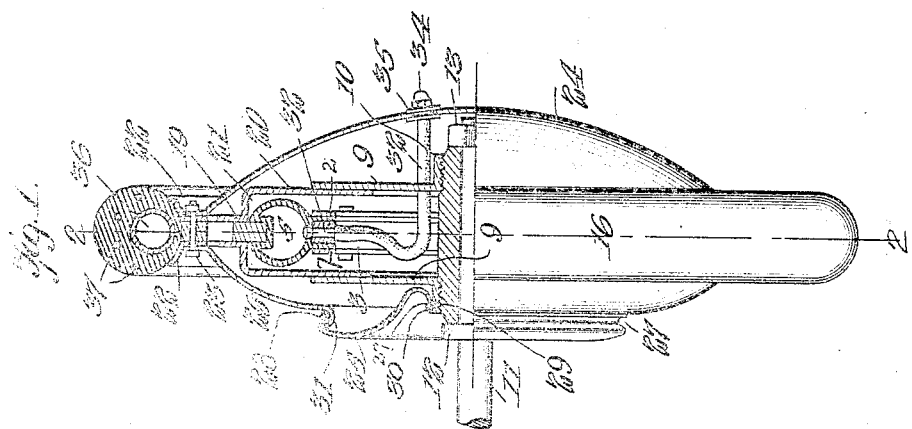
WITNESSES
INVENTOR
HERBERT A. WHEELING,
BY
ATTORNEYS H. A. WHEELING.
SPRING WHEEL.
APPLICATION FILED JUNE 14, 1912.
1,110,849.
Patented Sept. 15, 1914.
2 SHEETS—SHEET 2.
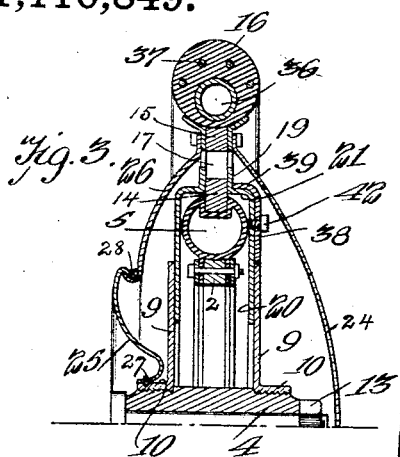
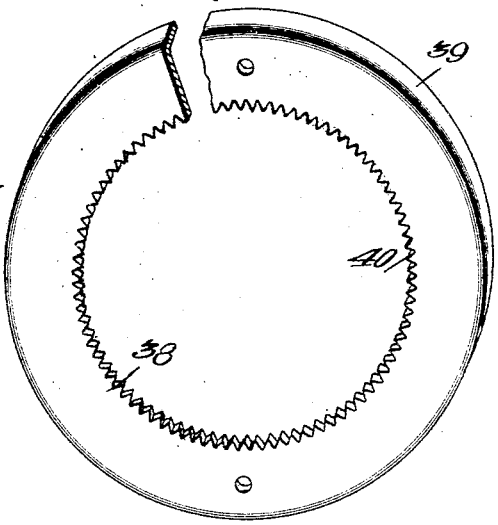
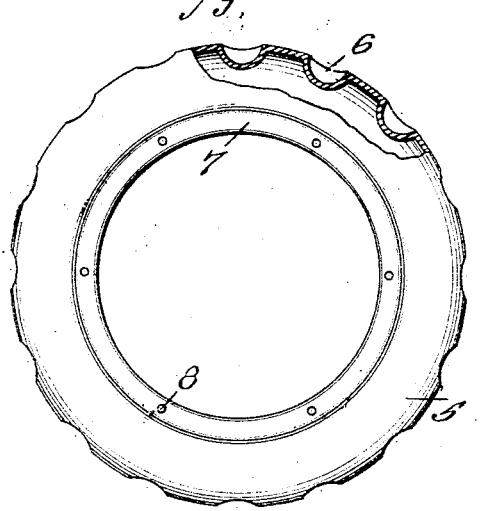
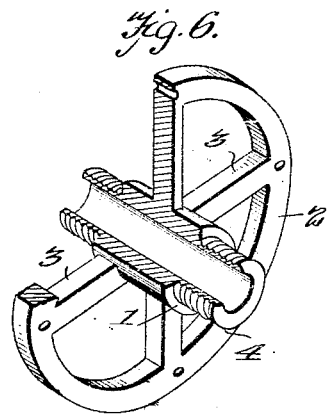
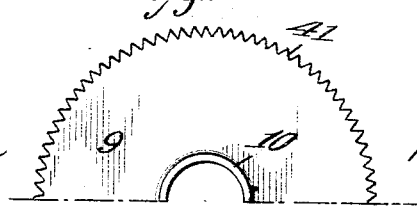
WITNESSES
E. M. Callaghan
C. E. Trainor
INVENTOR
HERBERT A. WHEELING
BY Munn & Co.
ATTORNEYS

UNITED STATES PATENT OFFICE.

HERBERT A. WHEELING, OF CARTHAGE, MISSOURI.

SPRING-WHEEL.

1,110,849.

Specification of Letters Patent. Patented Sept. 15, 1914.

Application filed June 14, 1912. Serial No. 703,641.

*To all whom it may concern:*

Be it known that I, HERBERT A. WHEELING, a citizen of the United States, and a resident of Carthage, in the county of Jasper and State of Missouri, have invented certain new and useful Improvements in Spring-Wheels, of which the following is a specification.

My invention is an improvement in spring wheels, and has for its object, the provision of a wheel having a pneumatic tube so arranged, that while the wheel receives all of the resiliency imparted by the tube, the tube is protected from wear, puncture, or other injury.

In the drawings: Figure 1 is a view of a wheel embodying my improvements, the upper portion of the wheel being in central transverse vertical section, and the lower portion in edge view. Fig. 2 is a view of the wheel, the half to the right being in elevation, and the half to the left in central vertical section. Fig. 3 is a central transverse section of one-half of a wheel illustrating features not shown in the views already described. Fig. 4 is a perspective view of a portion of the filling for holding the parts in position when the tire is deflated. Fig. 5 is a side view partly in section of the inner tire; Fig. 6 is a perspective view, partly in section of the inner wheel; and Fig. 7 is a partial side view of the other portion of the filling shown in Fig. 4.

The present embodiment of the invention comprises an inner wheel of foundation, consisting of a hub 1, a rim 2, and spokes 3 connecting the hub and rim. The ends of the hub are extended, as shown in Fig. 6, and are externally threaded, as indicated at 4.

A pneumatic tire 5 is seated on the rim 3, and the said tire is provided on its peripheral surface with a series of spaced depressions 6. The tire is also provided with a pair of laterally spaced, annular flanges 7, the said flanges fitting on each side of the rim 2, and the flanges are secured together and to the rim by bolts or rivets 8.

An annular or ring shaped housing plate 9 is arranged on each face of the wheel, each plate having a lateral outwardly extending tubular extension or sleeve 10 at its center, which is internally threaded, and engaged with the adjacent end 4 of the hub.

11 indicates the spindle upon which the wheel is supported and turns. It is provided with an annular rib or collar 12 for engaging the inner end of the hub, and a nut 13 is threaded on to the outer end of the spindle, and bears against the outer end of the hub.

A two part ring or frame 14—15 is arranged between the intermediate tire 5 and an outer tire 16, the said ring or frame consisting of a pair of concentric radially spaced annular members 14 and 15, connected at spaced intervals by radial spokes 17. The inner member 14 is seated on the tire 5, and is provided with lugs 18, shaped to fit the depressions 6 of the tire, and engaging in the said recesses.

A housing plate is arranged on each face of the wheel, each plate being annular in form, and consisting of two portions 19 and 20 offset laterally from each other, and connected by a web 21. The portion 19 of each plate fits against the adjacent side of the ring or frame 14—15, while the portions 20 fit inside of the adjacent housing plate 9. The web 21 extends radially beyond the tire 5, and the portions 20 of the plates are spaced apart a sufficient distance to prevent interference with the tire. The housing plates are secured to the frame 14—15 by bolts passing through holes in the radial arms connecting sections 14 and 15.

Rim sections 22, curving outwardly and upwardly coöperate with section 15 of frame to form seat for tire 16. These sections are secured together and to the ring or frame 14—15 by bolts and nuts 23. The said bolts and nuts 23 also assist in holding in place a pair of shields or hoods, one of which, 24, is of circular contour and dished outwardly, and is arranged on the outer face of the wheel. The other hood or shield is composed of an inner section 25, of flexible fabric, and an outer section 26. The inner section has a central opening for the hub and for the sleeve 10 of the adjacent housing 9. The said section has its outer edge secured to the outer section of the hood or shield and its inner edge is secured on the sleeve 10 of the adjacent housing plate 9, the said sleeve 10 being annularly grooved as shown at 29 and a cord or wire 27 encircles the sleeve for securing the said edge in the groove. The outer edge is secured on a groove flange 31 at the inner edge of the outer section 26, by means of a cord or wire 28.

The inner tire 5 is provided with an inflating valve 32, extending radially through the rim 2 of the foundation wheel, and a rubber tube 33 extends radially inward from the valve, to a point near the periphery of the hub 1, and thence outwardly through the hood or shield 24. The tube is provided with a valve or closure 34 outside the shield, for permitting the tire to be inflated through the tube. The outer tire 16 may be of any usual or preferred construction, though it is preferably resilient.

In case of accidental deflation of the pneumatic tire, the ring shown in Fig. 4 may be used, as shown in Fig. 3, to bridge the gap left by the deflation of the said tire. The ring comprises a body 38, having at its outer edge an annular lateral flange 39. The ring is arranged outside of the portion 20 of the housing plate, with the flange 39 seating outside of the web 21. Two rings may be used if desired.

It will be noticed that the ring 38—39 has its inner edge serrated as shown at 40 and the said serrated edge is adapted to fit the serrated edge 41 of the housing plate 9, to fit serrated edge 4 of the housing plate 9. This prevents any crawling of the outer tire. The ring, 38—39 is secured to the housing plate 19—20 by means of screws 42, the said screws being passed through the flange 38 of the ring 38—39 and engaged with the housing plate 20. The weight is not supported by the screws 42, but by pressure of portion 39 on portion 21 and serrated edge 40 upon serrated edge 41.

I claim:

1. A resilient wheel comprising a central wheel-like part having an elongated hub that is screw-threaded and a rim connected with the hub, an intermediate pneumatic tire supported upon the said rim, an outer tread tire, an annular frame between the two tires and connecting them, and a protecting housing for the intermediate pneumatic tire formed of side plates having hub sections screwed upon the hub of the central part of the wheel, and other side plates secured to the annular frame between the tires, and shaped to surround the intermediate tire but not to interfere with the free movements thereof, the two sets of side plates having overlapping engagement with each other and being free to move with reference to each other.

2. A wheel comprising a central hub part, an outer tire, an intermediate annular frame, a rigid circular support secured to the hub part of the wheel and having an exposed serrated peripheral edge, and a removable annular plate adapted to be secured rigidly to the said intermediate frame, and having a serrated edge adapted to engage with the serrated edge of the said rigid support and to serve to hold in working position the intermediate frame and outer tire and also to unite the said frame with the hub whereby torque movements are communicated from one of these to the other.

3. A resilient wheel comprising a central wheel-like part, an intermediate pneumatic tire secured to the rim thereof, an outer tire, an annular frame between the tires, a housing inclosing the pneumatic tire, and a dust cover for the outer face of the wheel consisting of an outwardly dished plate secured at its edges to the said annular frame between the tires.

4. A resilient wheel comprising a central wheel-like part, an intermediate pneumatic tire secured to the rim thereof, an outer tire, an annular frame between the tires, a housing inclosing the pneumatic tire, a dust cover for the outer face of the wheel consisting of an outwardly dished plate secured at its edges to the said annular frame between the tires, and another dust cover for the inner face of the wheel consisting of a rigid outer section secured to the said annular frame and an inner section of flexible material between the said rigid outer section and the hub of the central wheel-like part.

HERBERT A. WHEELING.

Witnesses:
LEIGH I. DODWELL,
H. L. MOSELEY.